United States Patent [19]

Calandro et al.

[11] Patent Number: 4,719,115
[45] Date of Patent: Jan. 12, 1988

[54] PROCESS FOR SWEETENING BAKED COMESTIBLE AND PRODUCT PRODUCED THEREBY

[75] Inventors: Thomas P. Calandro, Paterson; Jan Karwowski, Franklin Lakes, both of N.J.

[73] Assignee: Nabisco Brands, Inc., Parsippany, N.J.

[21] Appl. No.: 673,788

[22] Filed: Nov. 21, 1984

[51] Int. Cl.$^4$ .................. A23L 1/236; A23L 1/10; A23P 1/08
[52] U.S. Cl. ..................... 426/302; 426/94; 426/548; 426/455; 426/497; 426/449
[58] Field of Search ............... 426/94, 96, 103, 302, 426/548, 455, 496, 497, 506, 804, 620, 621, 625, 446, 449, 289, 290, 384, 385, 615, 639, 640, 295

[56] References Cited

U.S. PATENT DOCUMENTS

| | | | |
|---|---|---|---|
| 3,406,078 | 10/1968 | Williams | 426/290 |
| 3,501,319 | 3/1970 | Ewalt | 426/385 |
| 3,930,034 | 12/1975 | Shanbney et al. | 426/639 |
| 3,931,434 | 1/1976 | Murai | 426/295 |
| 3,955,000 | 5/1976 | Baggerly | 426/548 |
| 3,976,793 | 8/1976 | Olson | 426/96 |
| 4,079,151 | 3/1978 | Schade et al. | 426/548 |
| 4,378,377 | 3/1983 | Gajewski | 426/302 |
| 4,501,759 | 2/1985 | Gajewski | 426/302 |
| 4,540,587 | 9/1985 | Gajewski | 426/96 |
| 4,542,033 | 9/1985 | Agarwala | 426/615 |
| 4,614,657 | 9/1986 | Sheng et al. | 426/96 |

OTHER PUBLICATIONS

Searle Biochemics Technical Bulletin, 1974, EQUA 200 TM (Aspartame) Sweetener as a Food Ingredient.
Watt et al., 1975, Composition of Foods, Agriculture Handbook No. 8, U.S.D.A., Washington, D.C., pp. 26 and 66.
Pryzbyla. 1982, (Aug. issue pp. 130–131), Processed Prepared Foods.

*Primary Examiner*—Raymond N. Jones
*Assistant Examiner*—Carolyn Paden
*Attorney, Agent, or Firm*—Richard Kornutik

[57] ABSTRACT

Comestibles, such as baked goods and cereal products, are sweetened by application of an aqueous solution of at least one L-aspartic acid sweetening derivative to provide products which exhibit a uniform sweetening response when eaten, i.e., they are substantially free of "hot spots". The sweetening derivative is absorbed into the comestible to obtain products which do not have a sugar-coated or sugar dusted appearance.

27 Claims, No Drawings

PROCESS FOR SWEETENING BAKED COMESTIBLE AND PRODUCT PRODUCED THEREBY

FIELD OF THE INVENTION

The present invention relates to the preparation of baked comestibles sweetened with an L-aspartic acid sweetening derivative. More specifically, this invention relates to a process for sweetening cereal products and baked goods by applying thereto an aqueous solution of an L-aspartic acid sweetening derivative, and to the product produced by the process.

BACKGROUND OF THE INVENTION

Various cereal products and baked goods are sweetened during preparation either by incorporating a sweetening ingredient in the starting mix prior to baking, or by applying a sweetening composition to the product after it has been baked. In the past, the sweetening agent generally employed for such purposes has been a nutritive carbohydrate sweetener, such as sucrose, fructose, corn syrup and the like. More recently, efforts have been made to replace the aforesaid carbohydrate sweeteners in baked comestibles due to concern over the effect of such sweeteners upon diet and dental health. Among the substitute sweetening agents proposed have been L-aspartic acid sweetening derivatives, particularly the dipeptide N-L-$\alpha$-aspartyl-L-phenylalanine methyl ester (aspartame).

The L-aspartic acid sweetening derivatives are potent sweetening agents, reportedly being, gram-for-gram, 100 to 200 times as sweet as sucrose. The intense sweetness produced by these compounds results in negligible calories when used at isosweet levels in place of sucrose. Similarly, the L-aspartic acid derivatives generally possess negligible cariogenicity.

The L-aspartic acid sweetening derivatives are known to be moisture sensitive, in that they contain an ester linkage that may hydrolyze to a dipeptide, which, in turn, may cyclize to the corresponding diketopiperazine (DKP), with a corresponding loss of sweetness. However, relatively stable solutions of these compounds may be prepared under controlled conditions of temperature and pH. An aqueous solution of aspartame, for example, has maximum stability at ambient temperature at a pH of about 4.3. Aspartame exhibits a maximum water solubility, (approximately 10 gm/100 ml at 20° C.) at a pH of 2.2 and a minimum solubility (approximately 1.0 gm/100 ml at 20° C.) at a pH of 5.2, its isoelectric point. Solubility increases with temperature increase.

The L-aspartic acid sweetening derivatives also tend to decompose to DKP at elevated temperature, with attendant loss of sweetness.

As a result of the heat instability problem a number of processes have been proposed in which a coating composition comprising the L-aspartic acid sweetening derivative is applied to the surface of the already baked comestible to reduce exposure of the sweetening derivative to elevated temperature over an extended period. However, because of the moisture sensitivity and relatively low solubility of the L-aspartic acid sweetening derivatives, the use of aqueous solutions thereof as a sweetening composition has been avoided. Incomplete solution of the L-aspartic acid sweetening derivatives tends to result in non-uniform sweetening in topical applications of such sweetening derivatives to the exterior of a baked comestible. Non-uniformity of application of these sweetening derivatives is a concern because of the production of "hot spots", which is an expression used by those experienced in the art to refer to a non-uniform sweetening response attributable to high concentrations of the sweetener at discrete locations on the foodstuff.

Various procedures have been suggested for applying L-aspartic acid derivative-containing sweetening compositions to baked comestibles, so as to overcome the moisture sensitivity and ameliorate the adverse effect produced by low solubility of these sweetening derivatives. Included among the suggested procedures have been several which involve encapsulating or coating particles of the L-aspartic acid derivative with edible coating materials followed by drying and granulation.

In U.S. Pat. No. 3,962,468, particles of L-aspartic acid derivatives are stabilized in a dry fixation by causing a slurry-forming level of undissolved hydrated particles of the sweetening agent to be dispersed in an aqueous dextrin solution as discretely distributed, undissolved particles, and drying the dispersion to encapsulate the particles of the L-aspartic acid derivative in the dextrin.

In U.S. Pat. No. 4,004,039, aspartame crystals are stabilized into a particulate form so as to be freeflowing with other powdered materials. The stabilization process involves admixing the crystals with a matrix-forming material such as dried coffee extract, whey, low dextrose equivalent starch polymers and protein extracts, heating the admixture to form a melt, in which the ester crystals are discretely distributed, calendering the melt between two rollers to submerge the crystals in the melt, cooling the same, and then granulating the products to produce particles which encapsulate the crystals distributed therein.

In U.S. Pat. No. 3,934,048, dipeptide sweeteners, including aspartame, are provided with a satisfactory rate of solubility and storage stability due to low hygroscopicity, by co-drying a solution of the dipeptide and an edible, bland, low-calorie polysaccharide.

Encapsulating or coating L-aspartic acid sweetening derivatives in the above manner, purportedly has the advantage of providing a comestible having the sweetening derivative in a relatively low hygroscopic state that achieves sweetness uniformity.

An approach to coating comestibles such as cereal products, baked goods and confectionary foodstuffs with an L-aspartic acid derivative containing-coating which attempts to minimize the above-noted problems caused by the thermal instability and low solubility of such sweetening derivatives is described in U.S. Pat. No. 3,955,000. In that process, the L-aspartic acid derivatives are admixed in aqueous suspension with a starch hydrolyzate comprising predominantly oligosaccharide solids having a low dextrose equivalency, of about less than 30, and applied as a coating solution to the comestible. The coating of the dried solution, it is disclosed, smoothes out the taste impact generated by any sweetening imbalance attributable to the incomplete solution of the sweetening derivative, or non-uniformity of its dispersion. The uniform distribution of sweetness, and attendant minimizing of "hot spots" when the food is eaten, is attributed principally to the starch hydrolyzate.

The coating solution used in the process of U.S. Pat. No. 3,955,000 is maintained at a temperature below 200° F. so as to have the L-aspartic acid derivative dispersed therein as undissolved hydrated particles. The solution is applied to the foodstuff by atomization or other spray techniques. The coated comestible, it is disclosed, is dried at product temperatures which do not exceed 200° F. in order to assure that the sweetening agent is not degraded. The coated comestible is dried to a stable moisture content of below about 8%.

The coating process of U.S. Pat. No. 3,955,000 produces a frosted or glazed product that has a sugar-coated appearance. Other substances, such as fat and starches, it is disclosed, can be incorporated in the coating to create a dull or crystalline appearance suggestive of other sweetened cereal applications. However, the appearance of a sugar coating, whether glazed or dull, is associated with an undesirable amount of sugar by many consumers. Further, the dextrins, and other additives in the coating, increase the calorific value of the foodstuff.

Still another prior art attempt to prepare comestibles having an L-aspartic acid derivative containing-coating is described in U.S. Pat. No. 4,378,377. The process involves preparing a coating composition comprising the sweetening derivative and hydrolyzed or unhydrolyzed vegetable protein isolates in an aqueous suspension, "enrobing" the comestible with the coating composition in an amount sufficient to provide the desired level of sweetness, and drying the coated comestible to a final moisture content of less than about 5.0%. The aqueous suspension essentially comprises, by weight, from about 0.1% to 4.0% sweetening derivative and from about 1% to about 30% vegetable protein. The weight ratio of aqueous suspension to comestible base may vary depending on the level of sweetness desired in the coating and the concentration of the sweetening derivative in the aqueous suspension. In general, the weight ratio of aqueous suspension of comestible base may range from about 1:12 to about 1:1.3, a weight ratio in the range from about 1:9 to about 1:3 being preferred. The enrobing step is generally practiced at a temperature of from about 50° F. to 100° F. for both the comestible base and the aqueous suspension. Any conventional enrobing technique may be employed, such as tumbling or spraying.

The proteinaceous suspending agents function to maintain the sweetening derivative in suspension, (i.e. a large fraction of the sweetener will not be dissolved, but will be suspended and dispersed), to bind the sweetening derivative to the surface of the comestible, and to aid in the even distribution of the suspension over the comestible base during enrobing. The use of the L-aspartic acid sweetening derivative and the vegetable protein isolates in combination, it is disclosed, has the advantage of permitting the use of ambient temperature or "cold water" aqueous suspensions in preparing coated comestibles, thereby minimizing thermal degradation of the sweetening derivative and attendance loss of sweetness.

The finished sweetened product, it is disclosed, has a sweetness profile similar to sucrose-sweetened comestibles and desirably comprises from about 0.05% to 0.4% of sweetening derivative and from about 1% to 20% of vegetable protein (dry weight). However, comestibles produced according to the process of U.S. Pat. No. 4,378,377 also have the appearance of having a sugar-coating which, as noted above, is associated with an excessive sugar content by many consumers. Moreover, the vegetable protein isolates used to provide the coating, such as soy protein isolates, often produce a slightly bitter aftertaste.

The process for sweetening baked comestibles according to the present invention provides an acceptable level of sweetness in the final products without providing a sugar coated appearance. The process enables the sweetening of natural products, such as shredded wheat, while retaining their natural appearance. The sweetening derivative is uniformily applied to the comestible, so that the occurrence of "hot spots" is at least substantially avoided. In practicing the present invention, it is unnecessary to encapsulate the sweetening derivative or incorporate a carrier or fixative therewith in order to prevent moisture degradation and consequential loss of sweetness. It is believed that the sweetening derivative is absorbed into the body of the foodstuff, and thereby protected from the deleterious effects of moisture, as opposed to remaining on the surface thereof where it may more readily undergo decomposition. Further, because the sweetening process of this invention requires no carrier or fixative, which generally are substances of relatively high viscosity, it is easier to operate than a process involving the application of a coating composition containing such additives. A decided advantage of the process of this invention is that minimal, if any, drying or heating of the sweetened baked comestible is required. Thus, unlike some of the prior art coating processes described above, in which drying at elevated temperature is an essential process step, the present invention involves no risk of thermal degradation of the L-aspartic acid sweetening derivative incorporated in the final product.

The products produced by the process of this invention are comestibles, such as cereal products and baked goods which have an L-aspartic acid sweetening derivative uniformily applied thereto, and exhibit a uniform sweetening response when eaten, but which do not have a sugar-coated appearance. These products also possess excellent shelf-stability.

The present invention is effective for sweetening a variety of comestibles with an L-aspartic acid sweetening derivative while retaining a natural product appearance. It is considerably more economical than the encapsulating, coating, or enrobing processes proposed heretofore.

SUMMARY OF THE INVENTION

The present invention is directed to the preparation of dry, baked comestibles that are sweetened by the application of a stabilized aqueous sweetening solution containing at least one L-aspartic acid sweetening derivative. The aqueous sweetening solution is stabilized by controlling the pH thereof in the range of from about 1.5 to about 4.0. An acid solution of the L-aspartic acid sweetening derivative is used to achieve minimum degradation and maximum solubility of the sweetening derivative.

The sweetening derivative is substantially uniformly applied to the comestible and absorbed beneath the surface thereof, thus precluding the appearance of a sugar-coating on the final product. By reason of its absorption into the foodstuff, the sweetening derivative is protected from the adverse effects of surface moisture. Moreover, minimal, if any, drying of the foodstuff at elevated temperature is required after application of the sweetening derivative to achieve a shelf stable product. Hence, there is little risk of degradation of the sweetening derivative incorporated in the final product due to the effects of moisture or temperature.

The product is baked to a moisture content below the desired shelf-stable level. The aqueous L-aspartic acid sweetening solution is then applied to the baked comestible to provide an acceptable level of sweetness and a shelf-stable moisture content. The initial moisture content of the baked comestible should be sufficiently low so that further heating of the product is not necessary. The sweetening solution is typically applied to comestibles having a moisture content from about 0.8% by weight to about 3.5% by weight to assure uniform absorption of the sweetening agent into the body of the comestible and to obtain a shelf-stable product without the need for subsequent drying at elevated temperatures. The moisture content of the finished sweetened comestible should be less than about 8% by weight for a shelf stable water activity of less than about 0.7.

Various comestibles may be sweetened in accordance with the present invention. However, it is especially suited for the preparation of a sweetened, dry, cereal product having a predetermined shape and thickness with visually apparent open pores on the surface thereof. The final product has a sweetened surface layer that is less than one-half of its thickness, with the L-aspartic acid sweetening derivative contained in the pores of the product. The sweetening derivative is confined to the surface layer and defines the same. The present invention is particularly useful for the preparation of shredded, ready-to-eat cereals, because the open porous structure of shredded cereals facilitates absorption of the sweetening solution. The final sweetened product has, interiorly of the aforesaid surface layer, a body portion of substantially uniform composition, with the surface layer comprising the sweetening derivative and the same composition that makes up the body portion. Shredded cereal products produced in this manner exhibit a uniform sweetening response when eaten, with no sugar-coated appearance. The natural appearance traditionally associated with 100% cereal grain cereals is retained when such products are sweetened in accordance with the present invention.

The present invention may also be used to advantage for sweetening ready-to-eat cereals admixed with dried fruit.

DETAILED DESCRIPTION OF THE INVENTION

The L-aspartic acid sweetening derivative used in the present invention is preferably N,L-α-aspartyl-L-phenylalanine methyl ester (aspartame), based on its recent approval for use in foods by the Food and Drug Administration. However, L-aspartic acid sweetening derivatives, such as those disclosed in U.S. Pat. No. 3,955,000 at column 3, line 63 to column 4, line 35, can also be used in producing sweetened dry baked comestibles in accordance with the present invention. Procedures for the preparation of such sweetening agents are well known to those skilled in the art. See, for example, U.S. Pat. No. 3,799,918. The aspartic acid sweetening derivative should not be encapsulated so as to facilitate dissolution and avoid a coated or sugar dusted appearance.

The sweetening solution employed in the present invention comprises at least one L-aspartic acid sweetening derivative dissolved in water. At least substantially all of the sweetening derivative should be dissolved in the water to facilitate spraying. The term "solution", as used herein, refers to a true solution, i.e. a homogeneous mixture formed by dissolving a solute (the sweetening derivative) in a solvent (water). The sweetening solution may contain other substances such as flavoring agents in solution and/or suspension, as described hereinbelow.

The aqueous solution of the L-aspartic acid sweetening derivative is preferably prepared by adding the sweetening derivative to a warm aqueous solution of a pharmaceutically acceptable acid, which raises the pH of the acidic solution. Additional acid may then be added to adjust the pH to a level at which the sweetening derivative exhibits optimal stability and solubility. The pH employed will depend upon the specific L-aspartic acid sweetening derivative or derivatives selected. The concentration of the sweetening derivative in the sweetening solution is normally up to about 10% by weight of the final solution, depending upon the solubility of the sweetening agent in water.

In the case of aspartame, the preferred concentration is about 0.03% to about 3.5%, most preferably about 2% by weight of the final solution. Aqueous solutions of aspartame have been found to have optimal stability and solubility at a pH of about 1.8 to about 2.3. However, a pH in the range of from about 1.5 to about 4.0 can be used. At a pH of less than about 1.5 or greater than about 4.0, the stability of the aspartame decreases noticeably. Also, at a pH of about 1, an unacceptably sour taste is imparted to the cereal product. At a pH greater than about 6.0, the solubility of the aspartame decreases to an unsuitable level. An aqueous aspartame solution for use in the present invention is preferably prepared by adding aspartame to an acidic solution having a pH of about 1 to about 1.5 to raise the pH to about 2.2 to about 2.3. Additional acid may be added to finely adjust the pH within the preferred pH range of about 1.8 to about 2.3.

The temperature of the water should be sufficiently high to completely dissolve the sweetening derivative and acid, but not so high as to adversely affect the stability of the sweetening derivative. In general, the water temperature should be in the range of from about 40° F. to about 210° F. In preparing a sweetening solution of aspartame, the temperature is preferably from about 70° F. to about 160° F., and most preferably from about 85° F. to about 115° F. to dissolve the aspartame without causing substantial decomposition. By maintaining the sweetening solution at temperatures within the above ranges, crystallization of the sweetening derivative from the solution prior to and/or during applicaton of the solution to the comestible may be avoided. Hot spots in the final product are also avoided by preventing crystallization.

The use of a true solution, as opposed to an aqueous suspension or dispersion of the sweetening derivative, facilitates handling by reducing equipment clogging and eliminating the need for any specilized equipment for handling suspensions or dispersions. In addition, the lower viscosity of the solution employed for the application of a given amount of sweetener assures the rapid attainment of substantially uniform distribution of the sweetening derivative.

The L-aspartic acid sweetening derivative used in preparing the sweetening solution is preferably in pure form. Ordinarily, the sweetening derivative will completely replace the carbohydrate sweetener content of the comestible. Complete replacement is preferred so as to reduce the cariogenicity of the final product to the maximum extent poassible. However, if desired, the L-aspartic acid sweetening derivative may be used in combination with other nutritive or artificial sweetening agents, to provide a level of acceptable sweetness. Representative of such sweetening agents are saccharin, acesulfam-K, talin, cyclamates, steboside, fructose, sorbitol, sucrose, glucose, and the like. However, such added sweeteners often lower the dissolution rate of the dipeptide sweeteners and/or increase the calorific value of the foodstuff unnecessarily.

The preferred pharmaceutically acceptable acids for use in the present invention are malic acid and citric acid. However, other known pharmaceutically acceptable inorganic or organic acids or buffering systems which include the acids can also be used provided they do not adversely affect the taste of the baked comestible. The organic acids are preferred organoleptically over the inorganic acids. Representative of other suitable organic acids are fumaric acid, adipic acid, tartaric acid and mixtures thereof. Malic acid is particularly preferred because it imparts a pleasant taste to the finished product. Representative of suitable buffering systems are any of the above organic acids in combination with an alkali metal salt thereof.

The sweetening solution also desirably contains an effective amount of a masking or flavoring agent. The flavoring or masking agent serves to hide any undesirable aftertaste the dipeptide sweetener may have and to enhance the sweetness of the finished product. The amount of flavoring agent added to the sweetening solution may be between about 0.5% and about 2.5% by weight of the solution. When an amount less than about 0.5% is used, the desired effect of the flavoring agent tends to become lost. When an amount greater than about 2.5% is used the taste of the flavoring agent may become too evident. Suitable flavoring agents include vanilla extract, maple, and fruit flavors, with vanilla being preferred. The flavoring agent should not detract from the uncoated appearance of the final product.

The sweetening solution is conveniently applied to the baked comestible using any air-pressure assisted spraying means. Various types of suitable equipment are widely used in food processing and are familiar to those skilled in the art. A suitable spray apparatus for this purpose is a JAU-¼ in. spray nozzle manufactured by Spraying Systems Co. It is desirable that the sweetening solution be applied to the baked comestible as a mist to assure even application of the sweetening derivative to the comestible. Spraying may be performed upon the top and/or bottom of the baked good.

By applying the sweetening solution in the manner described above to a baked comestible of predetermined shape and thickness with open pores on the surface thereof, a product is obtained which is characterized by having a sweetened surface layer less than one-half of the thickness of the comestible, and having contained in the pores an L-aspartic acid sweetening derivative, the sweetening derivative being confined to the surface layer and defining the same. In other words, the sweetening derivative penetrates beneath the surface of the comestible only to a limited extent. Thus, the finished product will have a body portion of substantially uniform composition interiorly of the sweetened surface layer, with the latter being composed of the sweetening derivative and the same composition that makes up the body portion.

Absorption of the sweetening solution into the baked comestible is facilitated if the moisture content of the comestible to which it is applied is less than about 3.5% by weight of the comestible. Generally, moisture contents as low as about 0.8% by weight can be achieved without burning or discoloration of the product. The drier the product is, the greater is the driving force for absorption of the aqueous sweetening solution into the product. This avoids the occurrence of hot spots on the surface of the product and a sugar coated appearance or a sugar dusted appearance.

The final moisture content of the sweetened comestible should be no more than about 8% by weight of the comestible, to prevent loss of a crisp texture and to prevent reduction in shelf stability. The water activity of the final product should be less than about 0.7, preferably less than about 0.6 to provide an extended shelf life of at least several months. The final shelf stable moisture content should be attained with little, if any, application of external heat to avoid decomposition of the aspartame and to reduce processing costs. Thus, preferably the comestible should be baked to a moisture content sufficiently low so that application of the aqueous sweetener solution alone provides a shelf stable product with an acceptable level of sweetness attributable to the sweetening derivative.

The aqueous sweetening solution is applied to the baked comestible at a rate which provides a level of acceptable sweetness, as determined by a professional taste panel, in the finished dried comestible. In the case of aspartame, for example, an application rate which would provide an aspartame level of about 0.03% to about 0.41% by weight of the finished product provides an acceptable level of sweetness.

Representative of the baked comestibles which can be sweetened in accordance with the present invention are baked goods, including cookies, and doughnuts, and cereal products, including ready-to-eat cereals in shredded, flaked, expanded extruded, fried, or other forms. Exemplary of cereal products which can be sweetened in accordance with the present invention are shredded wheat, corn flakes, puffed wheat, puffed rice, expanded oats, puffed corn, bran flakes, and whole bran cereal. Such cereal products are prepared in the usual manner and may be either toasted or untoasted. The present invention is particularly useful for the preparation of cereal products that have a wide open porous structure, wherein the pores are visually apparent, such as shredded wheat.

The process of the present invention is of particular advantage in sweetening ready-to-eat cereals admixed with dehydrated fruit, such as raisins, currants, blueberries, strawberries, dates, figs, apples, or bananas, or nuts. The problems involved in preparing a mixture of ready-to-eat cereal and dried fruit in which the fruit component has satisfactory texture and flavor are well known. If the fruit is dehydrated sufficiently to prevent spoilage, the texture of the dried fruit is unappetizingly tough, and unacceptable to much of the consuming public. On the other hand, if the fruit is only dehydrated to the extent it retains a high degree of moisture in order to have a soft texture: (1) it will either not be bacteriologically stable at room temperature or, (2) it will lose moisture to the dry cereal, causing the cereal to become soggy with the fruit becoming dry, hard, and excessively tough.

As a solution to the foregoing problem, it has been proposed to treat the fruit with various solutions which more or less balance the equilibrium vapor pressures of the fruit and dry cereal components of the mixture and thereby inhibit transfer of moisture from the fruit to the dry cereal when the two components are stored over long periods of time as a packaged mixture.

Sweetening a ready-to-eat cereal and dried fruit mixture in accordance with the present invention at least substantially eliminates the need for pre-treatment of the fruit component in the manner described above for the purpose of obtaining desirable fruit texture. When the sweetening solution used in the practice of this invention is applied to a mixture of ready-to-eat cereal and dried fruit in which the cereal component has a moisture content of less than about 3.5% by weight, the drier, lower water activity cereal component preferentially absorbs water from the solution, increasing its moisture content to an acceptable shelf stable level of less than about 8%. When the dehydrated fruit is raisins, for example, a final cereal moisture content is about 6.5% by weight in the packaged product. Accordingly, the process of the present invention may be used to simultaneously: (1) sweeten the mixture of dry cereal and fruit, and (2) adjust the moisture content of the dry cereal to a level more nearly that of the fruit, so as to reduce the tendency of moisture to migrate from the dry cereal to the fruit component of the mixture. The present invention thus has economic advantages as applied to mixtures of dry cereal or fruit in addition to the benefits noted above in connection with the sweetening of cereal products per se. The aqueous sweetening solution may also be separately applied to the dry cereal and the dehydrated fruit in accordance with the sweetening process of the present invention. The two sweetened products can then be admixed.

The following examples further describe the present invention. All percentages, parts or proportions are by weight and all temperatures are in °F. unless otherwise indicated.

EXAMPLE

A sweetening solution was prepared by adding to 1000 grams of water at 100° F., 3.0 grams of malic acid, followed by 12.0 grams of aspartame followed by 15.0 grams of vanilla powder. The resultant solution was of relatively low viscosity and contained no visible undissolved aspartame crystals. Analysis showed that 95% by weight of the aspartame is solubilized in the aqueous acid.

The sweetening solution thus prepared was applied to 368.0 g of toasted shredded wheat cereal having a moisture content of about 2.5%. An air atomizing nozzle was used to apply the solution at a rate of about 34.0 grams per 15 seconds under a pressure of 20 p.s.i.

The sweetened shredded wheat was analyzed by high performance liquid chromatography and was found to have an aspartame content of about 0.040% by weight. The sweetening derivative was not visible on the surface of the product. The sweetened product had a moisture content of about 7% by weight. Drying of the product was not required. No "hot spots" were detected when the shredded wheat was eaten in admixture with milk.

COMPARATIVE EXAMPLE

An aspartame-containing coating composition was prepared in accordance with the disclosure of U.S. Pat. No. 3,955,000, by adding 1000 grams of water at 100° F. to 650 grams of maltodextrin (Amaizo Brand), with stirring to eliminate lumps, and thereafter blending in 12 grams of aspartame with further stirring for about 5 minutes.

The resultant composition contained approximately 37% by weight undissolved aspartame crystals, and was relatively thick and sticky.

The coating composition was applied to toasted shredded wheat using the same application procedure and apparatus described in the above Example. The sticky nature of the composition caused periodic clogging of the spray nozzle during application.

The coated product was dried in a Proctor and Swartz oven for 25 minutes at 180° F. and analyzed by high performance liquid chromatography. The aspartame content of the dried product was about 0.055%. A slight shiny coating was apparent on the surface of the dried product that detracted from its natural look. "Hot spots" were detected upon eating the cereal in milk indicating that the coating resists dissolution with a consequent retention of undesirable localized concentrations of the aspartame.

What is claimed is:

1. A process for sweetening a dry, baked comestible with an L-aspartic acid sweetening derivative, which process comprises applying to the baked comestible a sweetening solution comprising water and at least one L-aspartic acid sweetening derivative, said solution having a pH in the range of from about 1.5 to about 4.0 and substantially all of said at least one sweetening derivative being dissolved in the water, so as to substantially uniformly distribute said sweetening derivative onto the surface of said comestible and to provide a sweetening amount of said sweetening derivative which is absorbed beneath the surface of said comestible thereby precluding the appearance of a coating upon the comestible, wherein the moisture content of the baked comestible before application of said sweetening solution is sufficiently low so that application of the sweetening solution raises the moisture content to a shelf stable level.

2. A process as claimed in claim 1, wherein the moisture content of the baked comestible before said application is from about 0.8% to about 3.5% by weight and after application of said sweetening solution it is less than about 8% by weight of said comestible.

3. A process as claimed in claim 2, wherein said sweetening derivative is N-L-α-aspartyl-L-phenylalanine methyl ester.

4. A process as claimed in claim 3, wherein the concentration of sweetening derivative in the sweetening solution is about 0.03% to about 3.5% by weight of said sweetening solution.

5. A process as claimed in claim 4, wherein the temperature of the sweetening solution is about 85° F. to about 115° F.

6. A process as claimed in claim 1, wherein the concentration of said sweetening derivative and the temperature of said sweetening solution are insufficient for crystallization of said sweetening derivative.

7. A process as claimed in claim 3, wherein said sweetening solution contains a pharmaceutically acceptable acid for maintaining the pH thereof in the range of about 1.8 to about 2.3.

8. A process as claimed in claim 7, wherein said pharmaceutically acceptable acid is at least one organic acid.

9. A process as claimed in claim 8, wherein said organic acid is malic acid or citric acid.

10. A process as claimed in claim 3, wherein said sweetening solution includes a flavoring agent.

11. A process as claimed in claim 10, wherein said flavoring agent constitutes from about 0.5% to about 2.5% by weight of said sweetening solution.

12. A process as claimed in claim 11, wherein said flavoring agent is vanilla powder.

13. A process as claimed in claim 1, wherein said comestible is a ready-to-eat cereal, said sweetening derivative is N-L-α-aspartyl-phenylalanine methyl ester and its concentration in the sweetening solution is about 0.030% to about 3.5% by weight of said sweetening solution.

14. A process as claimed in claim 13, wherein said cereal is a shredded cereal.

15. A process as claimed in claim 14, wherein said sweetening solution is applied to the baked comestible in the form of a mist.

16. A process as claimed in claim 13, wherein said cereal is a flaked cereal.

17. A process as claimed in claim 13, wherein said cereal is mixed with dried fruit.

18. A process as claimed in claim 17, wherein said sweetening solution is also applied to the dried fruit.

19. A process as claimed in claim 1, wherein said sweetening solution is applied using an air-pressure assisted spraying means.

20. A process for sweetening a dry, baked comestible with an L-aspartic acid sweetening derivative, which process comprises applying to the baked comestible a sweetening solution comprising water and at least one L-aspartic acid sweetening derivative, said solution having a pH in the range of from about 1.5 to about 4.0, so as to substantially uniformly distribute said sweetening derivative onto the surface of said comestible and to provide a sweetening amount of said sweetening derivative which is absorbed beneath the surface of said comestible thereby precluding the appearance of a coating upon the comestible, wherein the moisture content of the baked comestible before application of said sweetening solution is sufficiently low so that application of the sweetening solution raises the moisture content to a shelf-stable level less than about 8 percent by weight of said comestible.

21. A process for sweetening a dry, baked comestible with an L-aspartic acid sweetening derivative, which process comprises applying to the baked comestible a sweetening solution comprising water and at least one L-aspartic acid sweetening derivative, said solution having a pH in the range of from about 1.5 to about 4.0 and substantially all of said at least one sweetening derivative being dissolved in the said water, wherein the moisture content of the baked comestible before application of said sweetening solution is sufficiently low so that application of the sweetening solution onto the surface of said comestible provides a sweetening amount of said sweetening derivative which is absorbed beneath the surface of said comestible thereby precluding the appearance of a coating upon the comestible, and raising the moisture content of the baked comestible to a shelf stable level.

22. A process as claimed in claim 21, wherein said sweetening derivative is N-L-α-aspartyl-L-phenylalanine methyl ester and said sweetening solution contains at least one organic acid selected from citric acid and malic acid in an amount effective to maintain the pH of said solution in the range of from about 1.8 to about 2.3.

23. A process as claimed in claim 21, wherein said sweetening solution contains an amount of a flavoring agent effective to enhance the sweetness of said sweetening derivative as applied to said comestible and to at least partially mask any unpleasant aftertaste associated with said sweetening derivative.

24. A process for sweetening a ready-to-eat cereal admixed with dried fruit with an L-aspartic acid sweetening derivative, which process comprises applying to said cereal and said fruit a sweetening solution comprising water and at least one L-aspartic acid sweetening derivative, said solution have a pH in the range of from 1.5 to about 4.0 and substantially all of said at least one sweetening derivative being dissolved in the water, so as to substantially uniformly distribute said sweetening derivative onto the surfaces of said cereal and said fruit and to provide sweetening amounts of said sweetening derivative which are absorbed beneath the surfaces of said cereal and said fruit thereby precluding the appearance of coatings upon said cereal or said fruit, wherein the moisture content of said cereal and said fruit before applying said sweetening solution are such that applying the sweetening solution produces moisture contents in said cereal and said fruit which provide a shelf stable product, and wherein the moisture content of said cereal is increased to a level more nearly that of said fruit, to minimize the migration of moisture to said cereal from said fruit.

25. A process as claimed in claim 24 wherein said sweetening solution is applied to said cereal in admixture with said fruit.

26. A process as claimed in claim 24 wherein said sweetening solution is applied to said cereal and said fruit separately.

27. A process for sweetening a dry, baked comestible with an L-aspartic acid sweetening derivative, which process comprises applying to the baked comestible a sweetening solution comprising water, at least one L-aspartic acid sweetening derivative and a flavoring agent comprising a vanilla flavor, said solution having a pH in the range of from about 1.5 to about 4.0, so as to substantially uniformly distribute said sweetening derivative onto the surface of said comestible and to provide a sweetening amount of said sweetening derivative which is absorbed beneath the surface of said comestible thereby precluding the appearance of a coating upon the comestible.

* * * * *